(12) United States Patent
Selleck

(10) Patent No.: US 6,237,981 B1
(45) Date of Patent: May 29, 2001

(54) UTILITY VEHICLE BODY CONVERTIBLE FOR CARRYING CARGO OR PASSENGERS

(75) Inventor: Daniel Selleck, Cameron, WI (US)

(73) Assignee: Pug Power LLC., Jackson, MS (US)

( * ) Notice: Subject to any disclaimer, the term of this patent is extended or adjusted under 35 U.S.C. 154(b) by 0 days.

(21) Appl. No.: 09/439,663

(22) Filed: Nov. 15, 1999

(51) Int. Cl.[7] .................................................. B60N 2/02
(52) U.S. Cl. .......................... 296/66; 296/39.2; 296/64; 296/65.05; 296/65.16; 296/69
(58) Field of Search .................... 296/39.2, 64, 65.05, 296/65.16, 66, 69

(56) References Cited

U.S. PATENT DOCUMENTS

| | | | |
|---|---|---|---|
| 1,919,063 | * | 7/1933 | Hubbard ................................. 296/64 |
| 2,502,061 | * | 3/1950 | Radford ................................. 296/66 |
| 3,097,881 | * | 7/1963 | Aguilar ................................. 296/69 |
| 3,114,570 | * | 12/1963 | Farrow et al. ........................ 296/66 |
| 3,151,906 | * | 10/1964 | Roberts ................................. 296/66 |
| 3,227,488 | * | 1/1966 | Kosbab et al. ....................... 296/66 |
| 3,473,840 | * | 10/1969 | Miles ................................... 296/69 |
| 3,829,151 | * | 8/1974 | Fellenstein ............................ 296/64 |
| 4,005,898 | * | 2/1977 | Way ..................................... 296/69 |
| 4,139,232 | * | 2/1979 | Cerf et al. ............................ 296/66 |
| 4,190,911 | * | 3/1980 | Wadsworth ........................... 296/69 |
| 4,473,250 | * | 9/1984 | Truex et al. .......................... 296/69 |
| 4,480,868 | * | 11/1984 | Koto .................................... 296/66 |
| 4,573,225 | * | 3/1986 | Wolf .................................... 296/69 |
| 4,911,493 | * | 3/1990 | Muirhead ............................. 296/39.2 |
| 5,007,671 | * | 4/1991 | Oprea .................................. 296/39.2 |
| 5,368,354 | * | 11/1994 | Martin ................................. 296/64 |
| 5,482,346 | * | 1/1996 | Lesourd ............................... 296/66 |
| 5,971,464 | * | 10/1999 | Davis et al. .......................... 296/66 |
| 5,975,610 | * | 11/1999 | Tracy .................................. 296/69 |
| 5,975,612 | * | 11/1999 | Macey et al. ....................... 296/65.05 |
| 5,979,964 | * | 11/1999 | Ban et al. ............................ 296/66 |
| 6,042,169 | * | 3/2000 | Emery ................................. 296/39.2 |

OTHER PUBLICATIONS

*Golf Car Advisory*, vol. 7, No. 1, Nov./Dec. 1999.

* cited by examiner

*Primary Examiner*—D. Glenn Dayoan
*Assistant Examiner*—Kiran B. Patel
(74) *Attorney, Agent, or Firm*—Schnader Harrison Segal & Lewis LLP

(57) ABSTRACT

A utility vehicle body is shown that may be easily and quickly converted, without tools from a flat-bed cargo hauling configuration to a configuration having seating for one to three passengers and a reduced cargo-carrying area. The body may be retrofitted to existing utility vehicles or installed as original equipment. This convertible utility vehicle body is particularly adapted for use by personnel involved in landscaping, golf course maintenance, and maintenance of manufacturing and energy conversion facilities. It is also useful to persons who need access to remote areas for vocational, recreational, or residential activities.

23 Claims, 6 Drawing Sheets

UTILITY VEHICLE BODY CONVERTIBLE FOR CARRYING CARGO OR PASSENGERS

TECHNICAL FIELD

This invention relates to the field of utility vehicles, generally. The methods and apparatus are particularly related to the field of self-propelled light and medium-duty personnel and cargo-carrying vehicles, including such vehicles as estate vehicles, industrial vehicles, airport personnel transporters, turf maintenance vehicles, and vehicles useful in performing similar tasks, industrial maintenance vehicles, parts transporters, warehouse picking vehicles, among others. More specifically, this is an improved multiple-purpose utility vehicle that has a body that can be converted from a configuration for carrying people to a configuration for carrying cargo, including granular bulk cargo, very quickly and easily, without tools.

BACKGROUND

A variety of utility and specialty vehicles have been, and continue to be, used to accommodate the specific needs of various endeavors. Golf courses, airports, and factories are examples of enterprises that use special purpose vehicles to move goods and transport passengers from one place to another. The market for any particular model of this type of off-road vehicle is relatively small compared to the size of the market for vehicles used for highway transportation, agriculture, construction, and the like.

Specialty vehicles may be expensive to purchase. For example, the economies of scale available to the manufacturer of a popular family sedan are unavailable to the producer of a special-purpose motorized parts carrier used in an automobile assembly plant. Innovations that facilitate reconfiguration of a generalized utility vehicle from one purpose to another can provide competitive and operational advantages to both the manufacturer and end users.

Large industrial facilities such as grain mills, electrical generating power plants, manufacturing enterprises, golf courses, and college campuses all routinely dispatch maintenance, management, or production support personnel to geographically separated locations. Those personnel may also utilize helpers, supplies, production parts, repair parts, tools, and other items. Sometimes it is advantageous for a repair technician to travel to the site to evaluate what materials, assistance, and equipment will be needed to carry out the assigned tasks. Additional trips may be needed to assemble the needed crew and materials.

Golf course maintenance requires the delivery of landscaping materials, turf care products, tools, personnel, etc. to various locations. It can be a particular difficulty to quickly transport more than a single individual with the conventionally available course maintenance vehicles. Among the undesirable results of this situation are that: a single individual may be assigned to tasks that require much more time to accomplish than would be needed if carried out by a team; extra vehicles may be required to transport additional personnel to and from a work site; extra trips and disruption of scheduled activities may be required to convey personnel to and from a work site. The following example illustrates the problem: Suppose that a golf course manager needs to amend a bunker, replace some sod and prune several trees and shrubs at a remote location.

A landscape supervisor might, in this example, prefer to take the necessary personnel, supplies, and equipment to the site, see that the tasks are properly underway, and proceed to another location. Doing so is unlikely to be convenient because few load-carrying or traction vehicles carry passengers. For this reason, it is often necessary to provide each work crew of two individuals with an expensive utility vehicle which will (or should) remain idle while the work is underway. If the supervisor determines that the tasks might be most efficiently accomplished by a crew of three persons, the supervisor might travel to the site in a vehicle with one crew member while the other two individuals proceed in a separate vehicle that will remain with the crew. But when it is time to return, the ordinary utility vehicle cannot carry the whole crew of three, so it will be necessary to make two trips. In view of this, two crews of two, each with a vehicle, might be assigned to the tasks.

Providing two vehicles, neither of which is really needed, to carry out the work, may be so expensive that a facility operator may find it impractical. One or both work crews may need to walk to many work sites which reduces productivity and increases the likelihood that personnel may ride vehicles that are not designed for passengers. It would be advantageous to have a utility vehicle that could carry some tools and materials together with several additional passengers in this and similar instances. A supervisor could then take three workers, their tools, and necessary materials to the site. Once work was underway, the supervisor could go on to other things. At the proper time, a vehicle could be dispatched to return with the crew. Substantial cost savings result from reducing the number of specialty vehicles needed from three to one.

Earlier workers in the fields of passenger vehicle and cargo vehicle design have attempted to expand the range of purposes for which particular models may be used. Availability of optional configurations or features that allow a vehicle to fulfill additional needs beyond a primary one can greatly increase the functionality of a vehicle and enhance the value of the vehicle to the owner.

Some vehicles have features that allow passenger-carrying spaces to convert to a cargo-carrying mode. For example, it is an established practice to provide automobile seat backs that fold down to accommodate cargo that is too large to fit into the trunk. In a variation on that practice, Minka discloses" a Convertible Seat of a Vehicle that extends the trunk enclosure of a coupe or sedan into the passenger space by hinging the rear seat back at the top and rotating the bottom of the seat back forward to a horizontal orientation. The seat bottom is hinged at the front and the bottom of the seat rotated upwardly to a vertical orientation.

Station wagons may also be equipped with a rear seat that folds flat to make a load-carrying surface coplanar with the interior side of an open, horizontally-hinged, tailgate. A Fold-away Auxiliary Seat Unit for a Vehicle is disclosed in U.S. Pat. No. 5,482,346 for just such an apparatus.

Ferrara shows a Vehicle Seat in U.S. Pat. No. 4,191,417 which is suitable for fitting into sport-utility vehicles. It is adapted to have the seat back fold forward over the seat bottom so that the cushion portions of the back and bottom come into facing contact to bring the uncushioned side of the seat back coplanar with the load-contacting bed surface.

Evenrude shows a Convertible Golf Car in U.S. Pat. No. 3,471,071 that includes a seat with a complex linkage that allows the,car to transport golf bags, passengers, or cargo. The seat cushion is exposed at all times making it unsuited for hauling bulk materials, sod, tools, or machinery.

In U.S. Pat. No. 4,125,284 Hicks et al. show a Vehicle with Convertible Step and Foot Rest. Unfortunately, their design precludes cushions for either the seat or the back. Passengers desiring to travel in the Hicks et al. vehicle would be seated directly onto the cargo-carrying surface which may make it difficult for passengers to keep their clothing clean.

Green's Retrofittable Passenger or Cargo Carrier for a Golf Cart is described in U.S. Pat. No. 5,429,290. It is a conceptually different approach which places the additional passengers face-to-face on opposite sides of the vehicle. Many people find it uncomfortable to be seated in a position facing perpendicular to the direction of vehicle travel.

None of the utility vehicles known in the art satisfactorily provide both passenger-carrying and load-carrying capacity. Similarly, none of the vehicles provide a system that allows the conversion of passenger-carrying space to cargo-carrying space and back with sufficient quickness and ease to make it practical to do so several times during each day. None of the previously known convertible seat systems for utility vehicles shows a system that provides seat and back cushions that are protected from grime, dust, moisture, and loaded materials when the bed is in cargo-carrying mode and the seats are not in use.

What is needed, then, is a utility vehicle body convertible for carrying cargo or passengers that can carry cargo, including bulk material cargo, and be convertible for comfortably carrying passengers on seats that are uncontaminated by the materials previously hauled. Another need is for a utility vehicle that can be converted from cargo-carrying to passenger-carrying and back easily and quickly many times during a single day. Another long-felt need is for a utility vehicle that comfortably accommodates a driver and at least three additional passengers plus some tools, equipment, or materials.

SUMMARY OF THE INVENTION

In contrast to the devices mentioned above and the developments of other skilled individuals, this vehicle and body convertible for carrying cargo or passengers is unmatched in its simplicity and functionality. While it is likely to be embodied as original equipment in newly manufactured vehicles, the convertible body can readily be retrofitted to many existing utility vehicles.

A typical utility vehicle bed has a horizontal planar rectangular upper surface, is supportingly affixed to the vehicle frame, and is situated behind the operator seat, above the rear wheels. There may also be vertical sides and ends that are either fixed or removable. A stake bed is quite common because the vertical sides and ends are easily removable by withdrawing vertical members from openings at the perimeter of the bed making it possible to load from either side or the rear. However, it may be preferred to have the sides and front of the bed permanently affixed to reduce initial cost and to discourage overloading. Whether the sideboards and front panel are fixed or removable, the tailgate is usually hinged transversely at the bottom so that the top of it may be rotated downwardly and rearwardly to form a rearward extension of the bed.

The tailgate may also be hinged at the top so that the bottom of the tailgate may be rotated rearwardly and upwardly away from the back end of the bed. Being able to open the tailgate at the bottom is often desirable when bulk materials are being off-loaded or spread using an optional tilt, or dump mechanism comprising a hydraulic pump, ram and control valves. It will be appreciated that a tailgate hinged both at the bottom and at the top is inherently removable.

Removing the tailgate makes it possible for an operator to grasp a cover, shaped in cross-section like an inverted letter "L," that houses the seat cushions, draw the lowest edge of the cover, first upward and rearward, so the cover pivots about a transverse hinge that is situated at the end of the shorter portion of the letter "L" and then continuing the pivot so that the movement continues upward and forward until the rotation has been continued approximately 180 degrees. That rotation brings the portion of the cover that was part of the upper surface of the of the bed into face-to-face contact with the immediately adjacent upper surface portion of the bed. The tailgate may be stowed on either side of the vehicle, at a shop or garage, or elsewhere when desired.

The seat and seat-back cushions are revealed by opening the seat cover the seat back maybe rotated upwardly and forwardly on a transverse hinge provided at the lower edge of the seat back when the seat back is in the full, upright position. The vehicle is ready for transporting passengers when these three steps are completed.

To convert the utility vehicle from the passenger-carrying configuration to the cargo-carrying configuration, simply reverse the three steps—pivot the seat back down into contact with the seat bottom cushion, close the seat cover, and, if desired, replace the tailgate. The vehicle is ready for transporting cargo when these three steps are completed.

DETAILED DESCRIPTION

Figure 1:
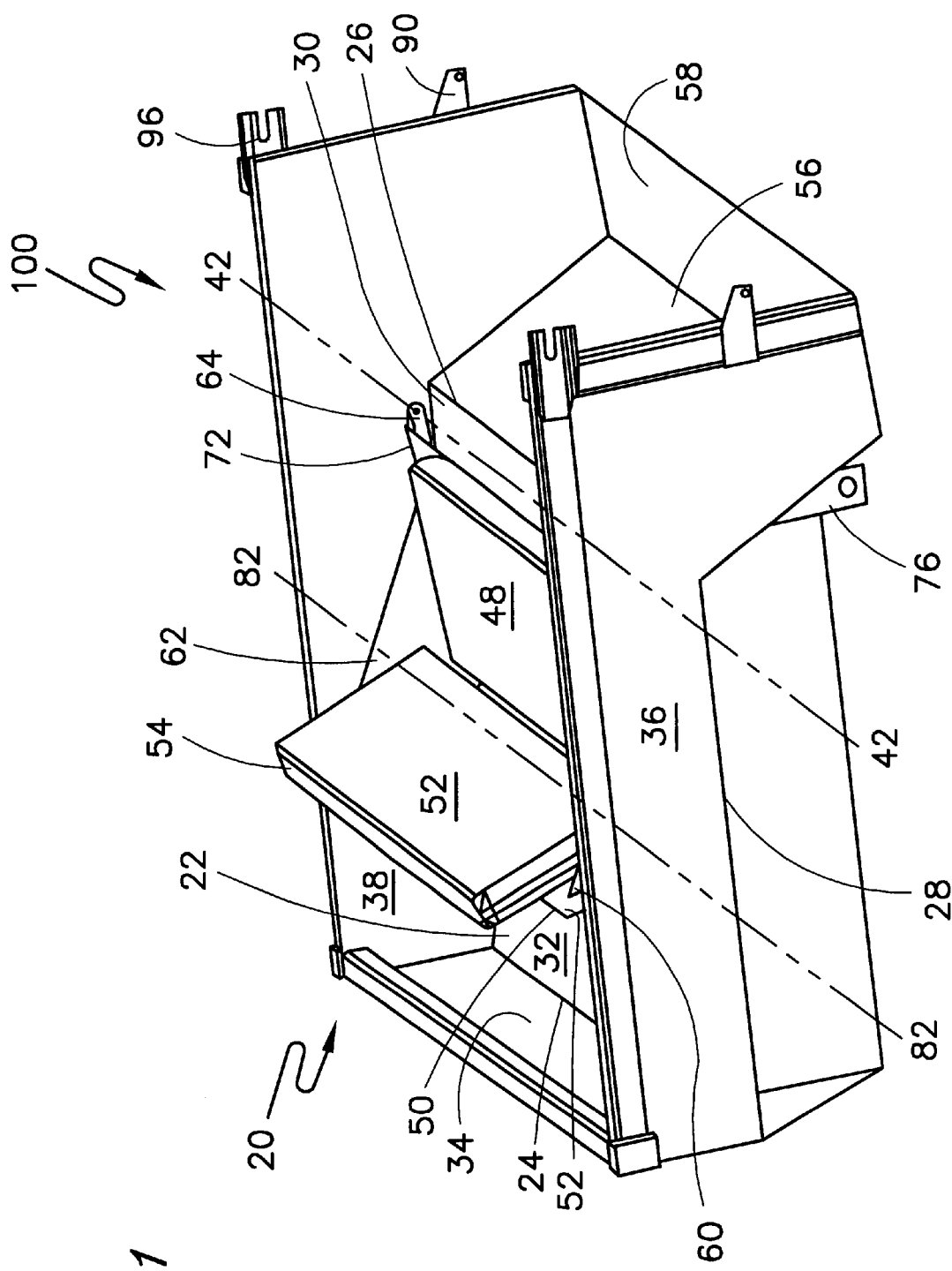
FIG. 1 is an isometric view looking down toward the left rear portion of the convertible utility vehicle body is configured for transporting passengers.

Referring now to the various figures of the accompanying drawings, FIG. 1 depicts a convertible utility vehicle body 20 with a generally rectangular fixed bed portion 22 that has a front edge 24, back edge 26, left edge 28, and a right edge 30. The upper surface 32 of the fixed bed portion 22 has at the perimeter a front panel 34, a left side 36, a right side 38, and a hinged bed portion 40 located opposite the front panel 34.

Figure 2:
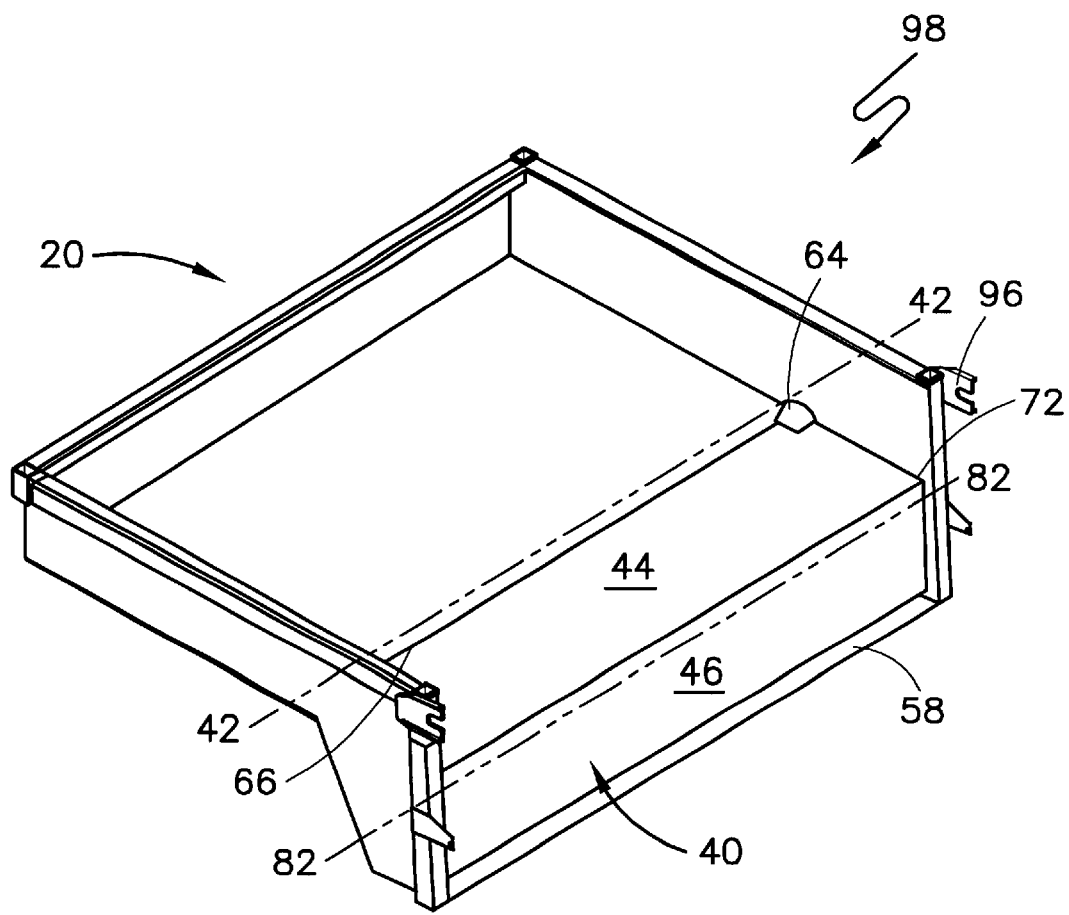
FIG. 2 shows the embodiment of FIG. 1 configured for transporting cargo.

FIG. 2 shows the hinged bed portion 40 that swings on a transverse hinge swing axis 42 which is generally parallel to the back edge 26 of the fixed bed portion 22. The configuration depicted in FIG. 2 shows the upper hinged surface 44 generally co-planar with the upper surface 32 of the fixed bed portion 22. A seat back upper surface 46 is formed generally downwardly perpendicular to the upper hinged surface 44 at the rear end of the hinged bed portion 40.

FIG. 1, viewed again, shows a seat cushion 48 affixed to the opposite side of the upper hinged surface 44. A back 50 has a back cushion surface 52 on the side opposite from the back upper surface 46. The back cushion surface 52 has a back cushion 54 affixed to it and is oriented generally perpendicular to the seat cushion 48.

A leg rest 56 extends generally downwardly from the back edge 26 of the fixed bed portion 22 and may be formed from the same piece of sheet material. A generally horizontal foot rest 58 extending from the leg rest may also be formed from the same sheet of material. However, it is equally possible to fabricate the convertible utility vehicle body 20 using separate pieces for these features.

There may be a left gusset 60 and a right gusset 62 or other reinforcement of the back 50. Compared to other reinforcement structures, the gussets 60 62 reduce the amount of dust that can penetrate to the cushions 48 54, especially if the gusset angles are set to correspond to the angle of the leg rest 56. It is to be understood that reinforcement may not be needed. If provided, the reinforcement material may be strap, bar, rod, or other shape, and need not be triangular plate.

The transverse bed hinge 64 may be pivoted on pins through the left and right sides, although it is possible to use other known hinge shapes. An advantage of locating the hinge swing axis 42 displaced from the hinged edge 66 is that space for a resilient seal 68 may be provided. The resilient seal 68 may run transversely on either the back edge 26, the hinged edge 66, or both, from the left hinged bed portion edge 70 to the right hinged bed portion edge 72. The seal 68 is optional, and although a resilient seal may be easier to use, it would also be possible to use a seal made of sheet or strip material, or no seal at all.

Figure 3:
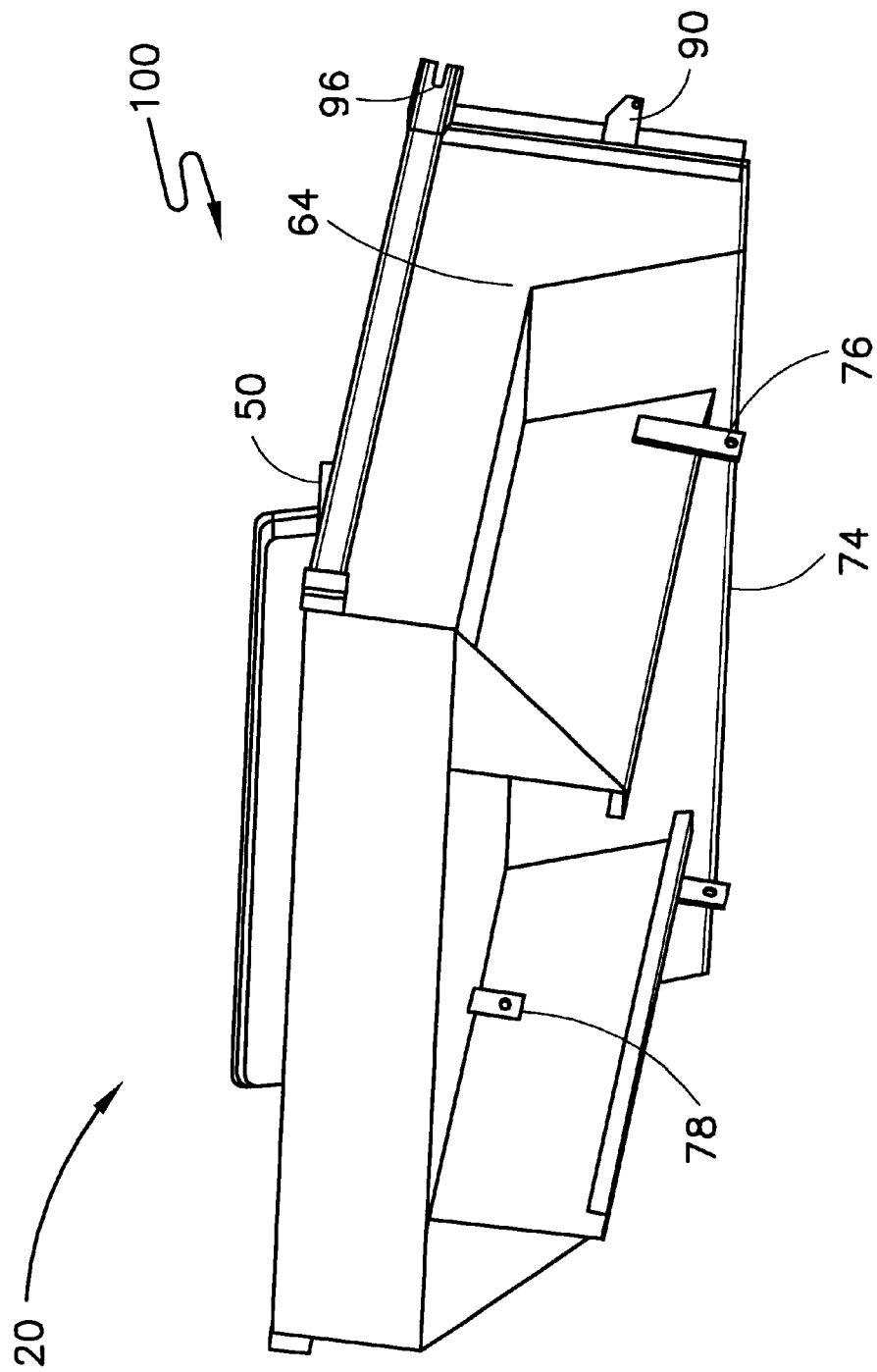
FIG. 3 shows the embodiment of FIG. 1 configured of transporting passengers looking up toward the left front portion of the convertible utility vehicle body.

FIG. 3 shows that the convertible utility vehicle body 20 may be configured as a dump body 74 by arranging an attachment point to serve as a dump body pivot 76 and by providing attachment points 78 for one or more optional hydraulic rams.

Figure 4:
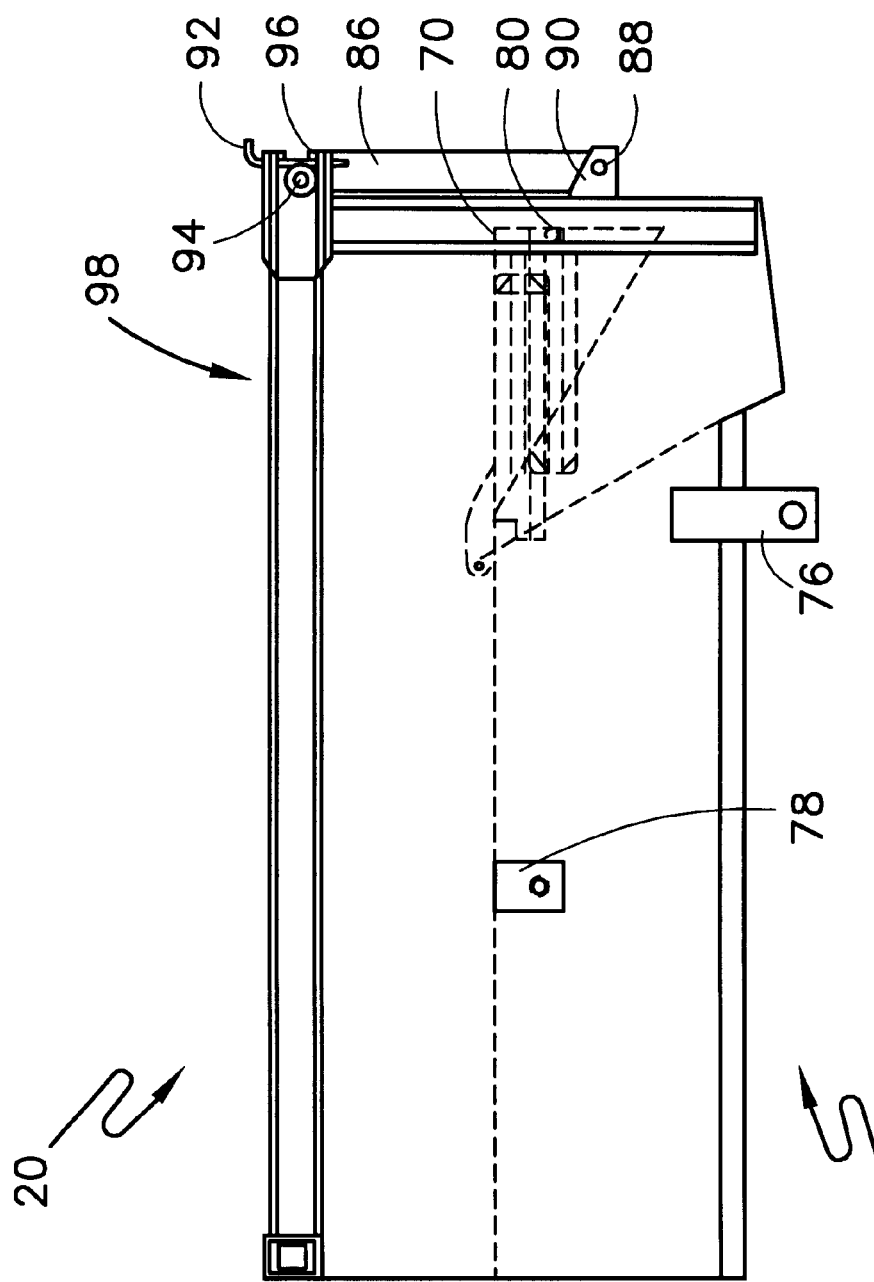
FIG. 4 is a side elevation of the convertible utility vehicle body of FIG. 1 configured for transporting cargo.

In FIG. 4, there is shown an installed optional removable tailgate 86. In order to remove the tailgate 86, sliding tailgate bottom hinge pins 88 maybe disconnected from the tailgate hinge bracket 90 and the top retaining pins 92 removed to allow the top tailgate swing pin 94 to be withdrawn from the u-bracket 96 located at the upper rear of the left side 36 and right side 38.

The back cushion 54 may be fitted at its lower edge with a back cushion hinge 80 having a pivot axis 82 transverse to the convertible utility vehicle body 20 and generally parallel to the hinge swing axis 42, as shown in FIG. 2. The back cushion hinge 80 allows the back cushion surface 52 to pivot forward to contact the seat cushion 48. There may optionally be provided a means for securing 84 the back cushion parallel to and proximate the seat cushion. Such a securing means includes any means now known or later developed, including, without limitation, tie straps, cords, clamps, clips, latches, hook and loop fasteners, spring catches, hook and eye fasteners, or slide fasteners. Some means for securing 84 the back cushion 54 will require a mating element 85 affixed proximate the seat cushion 48.

Figure 5:
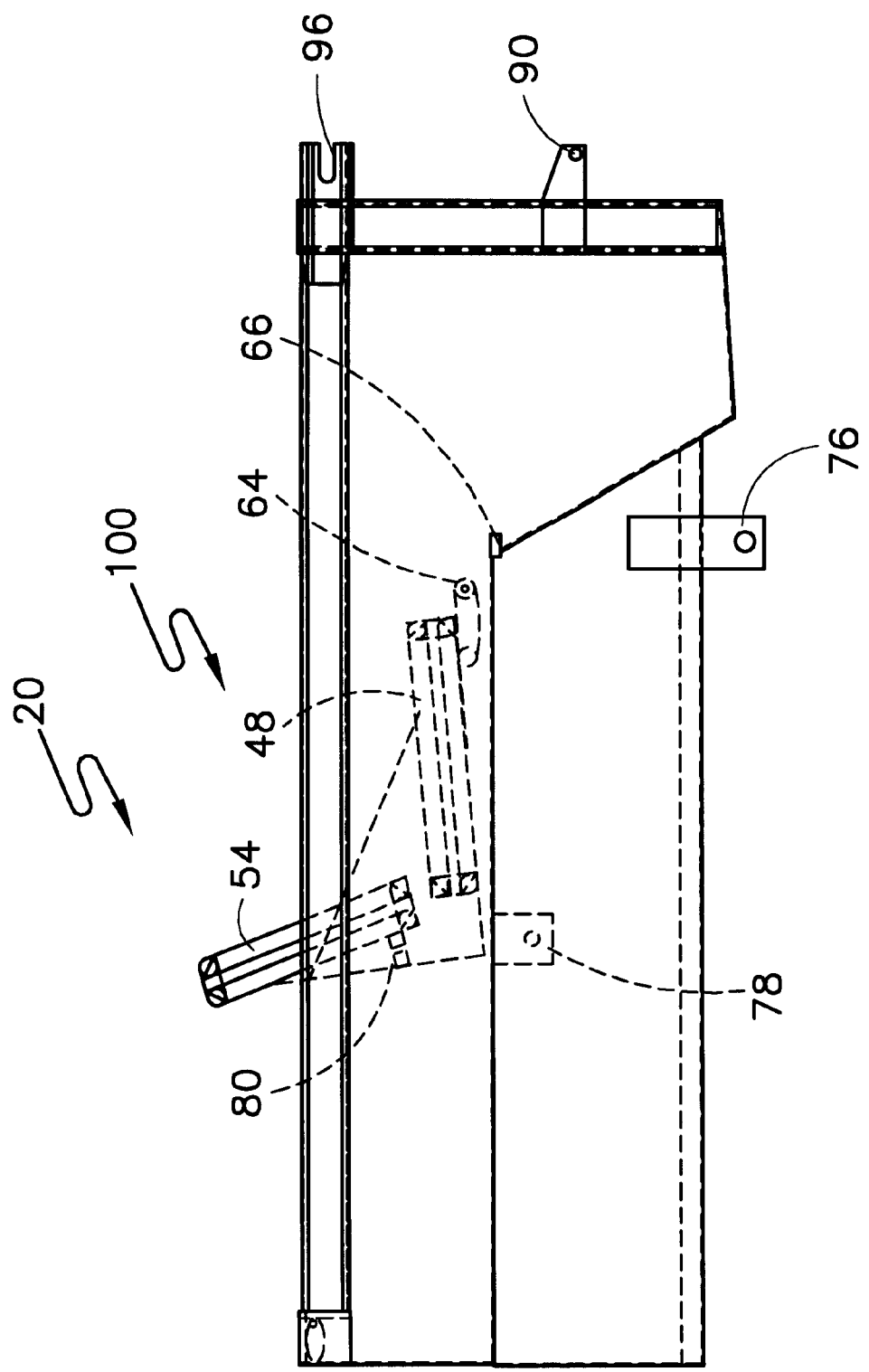
FIG. 5 is a side elevation of the convertible utility vehicle body of FIG. 1 configured for transporting passengers.

In FIG. 4, the convertible utility vehicle body 20 is configured in the cargo-carrying mode 98. In FIG. 5, the convertible utility vehicle body 20 is in the passenger-carrying mode 100.

Figure 6:
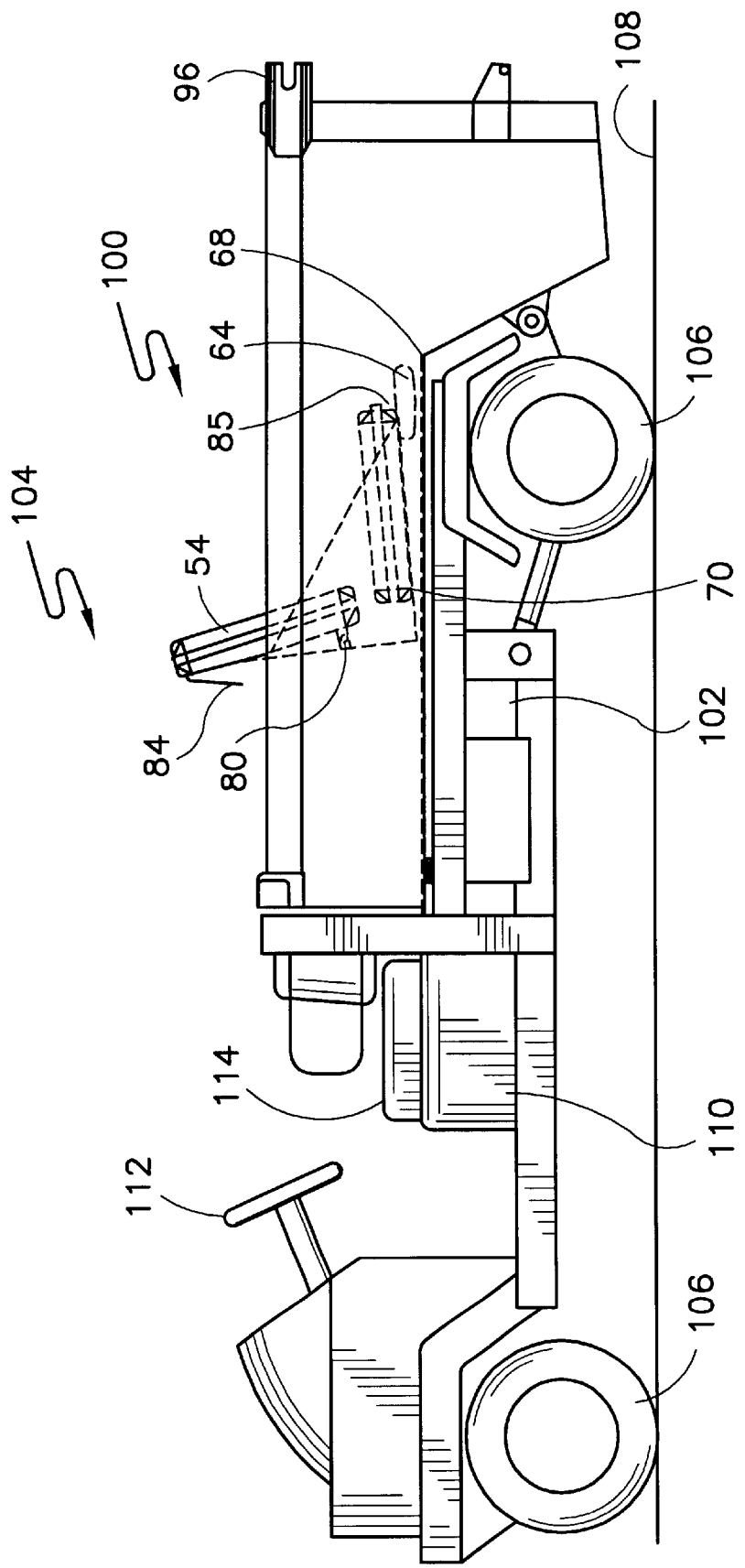
FIG. 6 is a side elevation of a utility vehicle on which is mounted the utility vehicle body of FIG. 5.

If the convertible utility vehicle body 20 is not to be configured as a dump body 74, the attachment points 76 78, or their equivalents, may be fixedly attached to the frame 102 of a typical utility vehicle 104 such as that depicted in FIG. 6. Most suitable utility vehicles 104 have flotation-type ground-contacting wheels 106 for traversing soft or carefully maintained terrain, but may be equipped with other wheel/tire combinations suited for operation over other generally horizontally support surfaces 108.

A housing for the prime mover 110 is normally provided to protect the internal combustion engine or electric motor within. Means for controlling 112 the various operational functions of the vehicle are normally positioned within the reach of an operator seated in the operator seat 114.

Thus, this invention encompasses a self-propelled, on-board operator controlled, terrain and other generally horizontal surfaces-traversing utility vehicle having a body convertible from a cargo carrying mode to a passenger carrying mode, comprising: a utility vehicle portion comprising at least three ground-contacting rotatable wheels, at least one wheel being steerable by an operator and at least one wheel being a driving wheel, a prime mover mounted on the frame, the prime mover being drivingly linked to the driving wheel, operative means for controlling vehicle speed and vehicle direction, the controlling means being accessible by an operator positioned at an operator seat attached to the frame, a utility vehicle body convertible for carrying cargo or for carrying passengers being affixed to the frame, the convertible body further comprising: a generally horizontally planar fixed bed portion having; a front edge, a back edge, a left edge, a right edge, an upper surface, a generally planar front panel located at the front edge of the fixed bed portion; the front panel extending generally perpendicularly upwardly from the upper surface of the fixed bed portion, and also extending transversely between the left edge of the fixed bed portion and the right edge of the fixed bed portion; a generally planar left side extending generally perpendicularly upwardly from the left edge of the fixed bed portion and generally rearwardly from the front panel, a generally planar right side extending generally perpendicularly upwardly from the right edge of the fixed bed portion and generally rearwardly from the front panel, a generally planar hinged bed portion situate between the left side and the right side, the hinged bed portion having; a hinge swing axis proximate the back edge of the fixed bed portion, an upper hinged surface generally coplanar with the upper surface of the fixed bed portion, a seat cushion surface opposite the upper hinged surface, a generally planar back upper surface situated opposite the hinge and angled downwardly between 60 degrees and 120 degrees with respect to the upper hinged surface, and a back cushion surface opposite the back upper surface.

The utility vehicle body convertible for carrying cargo or passengers may also include a generally planar leg rest portion extending generally downwardly from the back edge upper surface of the fixed bed portion, and/or a generally planar foot rest portion extending generally perpendicularly rearwardly from the leg rest portion; sides that extend downwardly proximate a foot rest and/or a leg rest that may extend transversely between the left side and the right side. The fixed bed portion, the leg rest, and the foot rest may easily be formed of a single sheet of metal or other planar material such as polymer, plastic, composite materials, wood, plywood, laminates, oriented strand board, fiberboard, particle board, fiberglass, vinyl, any and all of which are deemed equivalent to metal sheet for the purposes of the present disclosure, it being known that sheet steel has many advantages for the purposes of the present disclosure, among them durability, strength, easily worked with commercially available tools, and general acceptance among purchasers of outdoor power equipment.

Applications in which the convertible utility vehicle body may preferably be made of aluminum sheet, extrusion, and structural shapes may arise. Likewise, it may be preferable in some instances to make the convertible utility vehicle body from polymer or composites, whether laid-up, vacuum formed, roto-cast, injection molded, or manufactured using other techniques.

A reinforcing gusset member oriented generally parallel to and spaced apart slightly from the left side may be fitted between the back cushion surface and the seat cushion surface; a corresponding right gusset member oriented generally parallel to and spaced apart slightly from the right side may be fitted between the back cushion surface and the seat cushion surface.

A utility vehicle body convertible for carrying cargo or passengers is comprised of a generally horizontally planar fixed bed portion having a front edge, a back edge, a left edge, a right edge, an upper surface, a generally planar front panel located at the front edge of the fixed bed portion; the front panel extending generally perpendicularly upwardly from the upper surface of the fixed bed portion, and extending transversely between the left edge of the fixed bed portion and the right edge of the fixed bed portion, a generally planar left side extending generally perpendicularly upwardly from the left edge of the fixed bed portion and generally rearwardly from the front panel, a generally planar right side extending generally perpendicularly upwardly from the right edge of the fixed bed portion and generally rearwardly from the front panel, a generally planar hinged bed portion connected to the fixed bed portion by a transverse bed hinge having a hinge swing axis proximate the back edge of the fixed bed portion, the hinged bed portion having a hinged edge extending transversely between a left hinged bed portion edge and a right hinged bed portion edge, a hinged bed portion upper surface positionable generally coplanar with the upper surface of the fixed bed portion, a generally planar transverse back portion located at the portion of the hinged bed portion opposite the bed hinge, the back portion being angled between 60 degrees and 120 degrees downwardly from the hinged bed portion upper surface when the hinged bed portion upper surface is generally coplanar with the fixed bed portion upper surface, a seat cushion surface opposite the hinged bed portion upper surface, a back cushion surface opposite the back upper surface, a generally planar leg rest portion extending generally downwardly from the back edge upper surface of the fixed bed portion, and a generally planar foot rest portion extending generally perpendicularly rearwardly from the leg rest portion.

The utility vehicle body convertible for carrying cargo or passengers may be a hydraulically, electrically, or manually actuated dump body. The side's may extend downwardly proximate the foot rest. A resilient seal may also be interposed between the hinge edge of the hinged bed portion and the back edge of the fixed bed portion. The back cushion may be hinged with a hinge swing axis generally parallel to the bed hinge axis and proximate the seat cushion whereby the back cushion may be swung generally adjacent and parallel to the seat cushion for storage. A means for securing the back cushion parallel to and proximate the seat cushion for storage may be provided for convenience to make operating the convertible seat more convenient and to minimize the accumulation of dust on the seat and back cushions. Suitable means for securing the back cushion proximate the seat cushion for storage include, without limitation, resilient cord, straps, ties, hook-and-loop fasteners, shock cord, snaps, springs, tape, ribbon, mechanical fasteners of all types, latches, catches, seat belts, and other equivalent means.

The utility vehicle body convertible for carrying cargo or passengers may optionally include a removable tail gate that can be installed transversely between the left and right sides, and generally parallel to the front panel.

More generally, a utility vehicle body convertible for carrying cargo or passengers is shown; this body may easily be retrofitted to many types and models of utility vehicle.

From the foregoing, it may be readily understood by those skilled in the art that the embodiments disclosed are applicable to industry and outdoor power equipment generally, and to machinery and vehicles that are operated in off-road circumstances, particularly.

Changes and modifications in the specifically described embodiments can be carried out without departing from the scope of the invention which is intended to be limited only by the scope of the appended claims.

I claim:

1. A utility vehicle body convertible for carrying cargo or passengers, comprising:
   a. a generally horizontal fixed bed portion having;
      i. a front edge,
      ii. a back edge,
      iii. a left edge,
      iv. a right edge,
      v. an upper surface,
   b. a front panel located proximate the front edge of the fixed bed portion, the front panel;
      i. extending generally perpendicularly upwardly from the upper surfaced of the fixed bed portion,
      ii. extending transversely between the left edge of the fixed bed portion and the right edge of the fixed bed portion,
   c. a left side extending generally perpendicularly upwardly from the left edge of the fixed bed portion and generally rearwardly from the front panel,
   d. a right side extending generally perpendicularly upwardly from the right edge of the fixed bed portion and generally rearwardly from the front panel,
   e. a hinged bed portion moveable between a passenger carrying mode and a cargo carrying mode having;
      i. a hinge swing axis proximate the back edge of the fixed bed portion,
      ii. an upper hinged surface generally coplanar with the upper surface of the fixed bed portion,
      iii. a seat cushion surface opposite the upper hinged surface,
      iv. a back upper surface situated opposite the hinge and angled downwardly between about 60 degrees and about 120 degrees with respect to the upper hinged surface when in said cargo carrying mode and extending below said horizontal fixed bed portion, and
      v. a back cushion surface opposite the back upper surface.

2. The utility vehicle body convertible for carrying cargo or passengers defined in claim 1, further comprising:
   a. a leg rest portion extending generally downwardly from the back edge upper surface of the fixed bed portion, and
   b. a foot rest portion extending generally perpendicularly rearwardly from the leg rest portion.

3. The utility vehicle body convertible for carrying cargo or passengers defined in claim 2 wherein the sides extend downwardly proximate the foot rest.

4. The utility vehicle body convertible for carrying cargo or passengers defined in claim 3 wherein the foot rest extends transversely between the left side and the right side.

5. The utility vehicle body convertible for carrying cargo or passengers defined in claim 4 wherein the leg rest extends transversely between the left side and the right side.

6. The utility body convertible for carrying cargo or passengers defined in claim 3 wherein the leg rest extends transversely between the left side and the right side.

7. The utility vehicle body convertible for carrying cargo or passengers defined in claim 3 wherein the fixed bed portion, the leg rest, and the foot rest are formed of a single sheet of metal.

8. The utility vehicle body convertible for carrying cargo or passengers defined in claim 3, wherein a left gusset member oriented generally parallel to and spaced apart slightly from the left side is fitted between the back cushion surface and the seat cushion surface and a right gusset member oriented generally parallel to and spaced apart slightly from the right side is fitted between the back cushion surface and the seat cushion surface.

9. A utility vehicle body convertible for carrying cargo or passengers comprising:
   a. a generally horizontal fixed bed portion having;
      i. a front edge,
      ii. back edge,
      iii. a left edge,
      iv. a right edge,
      v. an upper surface,
   b. a front panel located at the front edge of the fixed bed portion, the front panel;
      i. extending generally perpendicularly upwardly from the upper surface of the fixed bed portion,
      ii. extending transversely between the left edge of the fixed bed portion and the right edge of the fixed bed portion,
   c. a left side extending generally perpendicularly upwardly from the left edge of the fixed bed portion and generally rearwardly from the front panel,
   d. a right side extending generally perpendicularly upwardly from the right edge of the fixed bed portion and generally rearwardly from the front panel,
   e. a hinged bed portion connected to the fixed bed portion by a transverse bed hinge having a hinge swing axis proximate the back edge of the fixed bed portion, the hinged bed portion having
      i. a hinged edge extending transversely between a left hinged bed portion edge and a right hinged bed portion edge,
      ii. a hinged bed portion upper surface positionable generally coplanar with the upper surface of the fixed bed portion,
      iii. a transverse back portion located at the portion of the hinged bed portion opposite the bed hinge, the back portion being angled between about 60 degrees and about 120 degrees downwardly from the hinged bed portion upper surface when the hinged bed portion upper surface is generally coplanar with the fixed bed portion upper surface,
      iv. a seat cushion surface opposite the hinged bed portion upper surface,
      V. a back cushion surface opposite the back upper surface,
   f. a leg rest portion extending generally downwardly from the back edge upper surface of the fixed bed portion, and
   g. a foot rest portion extending generally perpendicularly rearwardly from the leg rest portion.

10. The utility vehicle body convertible for carrying cargo or passengers defined in claim 9 wherein the vehicle body is a dump body.

11. The utility vehicle body convertible for carrying cargo or passengers defined in claim 9 wherein the sides extend downwardly proximate the foot rest.

12. The utility vehicle body convertible for carrying cargo or passengers defined in claim 10 wherein the back cushion is hinged with a hinge swing axis generally parallel to the bed hinge axis and proximate the seat cushion whereby the back cushion may be swung generally adjacent and parallel to the seat cushion for storage.

13. The utility vehicle body convertible for carrying cargo or passengers defined in claim 11 further comprised of a means for securing the back cushion proximate, and parallel to, the seat cushion for storage.

14. The utility vehicle body convertible for carrying cargo or passengers defined in claim 11 further comprised of an optional, removable tall gate that may be installed transversely between the left and right sides, and generally parallel to the front panel.

15. The utility vehicle body convertible for carrying cargo or passengers defined in claim 12 further comprised of an optional, removable tail gate that may be installed transversely between the left and right sides, and generally parallel to the front panel.

16. The utility vehicle body convertible for carrying cargo or passengers defined in claim 9 further comprised of a resilient seal interposed between the hinge edge of the hinged bed portion and the back edge of the fixed bed portion.

17. The utility vehicle body convertible for carrying cargo or passengers defined in claim 10 further comprised of a resilient seal interposed between the hinge edge of the hinged bed portion and the back edge of the fixed bed portion.

18. The utility vehicle body convertible for carrying cargo or passengers defined in claim 11 further comprised of a resilient seal interposed between the hinge edge of the hinged bed portion and the back edge of the fixed bed portion.

19. The utility vehicle body convertible for carrying cargo or passengers defined in claim 12 further comprised of a resilient seal interposed between the hinge edge of the hinged bed portion and the back edge of the fixed bed portion.

20. A self-propelled, on-board operator controlled, terrain and other generally horizontal surface traversing utility vehicle having a body convertible from a cargo carrying mode and a passenger carrying mode, comprising:
   a. a utility vehicle portion comprising at least three ground-contacting rotatable wheels, at least one wheel being steerable by an operator and at least one wheel being a driving wheel, a prime mover mounted on a frame, the prime mover being drivingly linked to the driving wheel, means for controlling the vehicle by an operator situate at an operator's seat attached to the frame,
   b. a utility vehicle body convertible for carrying cargo or passengers, the convertible body further comprising:
      i. a generally horizontal fixed bed portion having;
      ii. a front edge,
      iii. a back edge,
      iv. a left edge,
      v. a right edge,
      vi. an upper surface,
   c. a front panel located at the front edge of the fixed bed portion, the front panel;
      i. extending generally perpendicularly upwardly from the upper surface of the fixed bed portion,
      ii. extending transversely between the left edge of the fixed bed portion and the right edge of the fixed bed portion,
   d. a left side extending generally perpendicularly upwardly from the left edge of the fixed bed portion and generally rearwardly from the front panel, e. a right side extending generally perpendicularly upwardly from the right edge of the fixed bed portion and generally rearwardly from the front panel, f. a generally planar hinged bed portion having;
   i. a hinge swing axis proximate the back edge of the fixed bed portion,
   ii. an upper hinged surface generally coplanar with the upper surface of the fixed bed portion,
   iii. a seat cushion surface opposite the upper hinged surface,
   iv. a back upper surface situated opposite the hinge and angled downwardly between about 60 degrees and about 120 degrees with respect to the upper hinged surface when the upper hinged surface is generally coplanar with the fixed bed portion upper surface, and
   v. a back cushion surface opposite the back upper surface.

21. The utility vehicle body defined in claim 1, wherein the vehicle body is a dump body.

22. The utility vehicle body defined in claim 20, wherein the vehicle body is a dump body pivotable with respect to said utility vehicle portion.

23. The utility vehicle body defined in claim 22, further comprising a tilt mechanism including a hydraulic pump, a ram and control valves.

* * * * *